(12) United States Patent
Ueno (10) Patent No.: US 9,110,455 B2
(45) Date of Patent: Aug. 18, 2015

(54) NUMERICAL CONTROL MACHINE

(71) Applicant: OKUMA Corporation, Aichi (JP)

(72) Inventor: Shigeki Ueno, Aichi (JP)

(73) Assignee: OKUMA Corporation, Aichi (JP)

( * ) Notice: Subject to any disclaimer, the term of this patent is extended or adjusted under 35 U.S.C. 154(b) by 335 days.

(21) Appl. No.: 13/773,675

(22) Filed: Feb. 22, 2013

(65) Prior Publication Data

US 2013/0226355 A1 Aug. 29, 2013

(30) Foreign Application Priority Data

Feb. 23, 2012 (JP) ................. 2012-037442

(51) Int. Cl.
*G05B 19/18* (2006.01)
*G05B 19/416* (2006.01)

(52) U.S. Cl.
CPC ............. *G05B 19/18* (2013.01); *G05B 19/4166* (2013.01); *G05B 2219/43187* (2013.01); *G05B 2219/49077* (2013.01)

(58) Field of Classification Search
CPC ............... G05B 19/18; G05B 19/4166; G05B 19/49077; G05B 2219/43187
USPC ........................................................ 700/280
See application file for complete search history.

(56) References Cited

U.S. PATENT DOCUMENTS

| | | | |
|---|---|---|---|
| 2002/0003416 A1* | 1/2002 | Sagasaki et al. | 318/600 |
| 2004/0128018 A1* | 7/2004 | Sugie | 700/160 |
| 2010/0244762 A1* | 9/2010 | Mori et al. | 318/632 |
| 2011/0088523 A1* | 4/2011 | Yamada | 82/1.11 |
| 2011/0218666 A1* | 9/2011 | Sugie et al. | 700/160 |

FOREIGN PATENT DOCUMENTS

| | | |
|---|---|---|
| JP | 49105277 A | 10/1974 |
| JP | 11129144 A | 5/1999 |
| JP | 2005144580 A | 6/2005 |

OTHER PUBLICATIONS

Hideyuki et al JP2005144580 (machine translation) pp. 1-24.*
Patent Bibliographic Data of Japan, Publication No. 49-105277, Published on Oct. 14, 1974, 1 page.
Patent Abstracts of Japan, Publication No. 11-129144, Published on May 18, 1999, 1 page.
Patent Abstracts of Japan, Publication No. 2005-144580, Published on Jun. 9, 2005, 1 page.
Notice of Grounds for Rejection issued in Japanese Application No. 2012-037442, mailed on May 19, 2015 (5 pages).

* cited by examiner

*Primary Examiner* — Sean Shechtman
*Assistant Examiner* — Derrick Boateng
(74) *Attorney, Agent, or Firm* — Osha Liang LLP (57) ABSTRACT

A numerical control machine estimates a future rotational speed ahead by a delay time that is a phase difference between a rotational speed fluctuation of a main spindle and a feed rate fluctuation of a feed axis, and fluctuates the feed rate such that a constant ratio is maintained with the estimated rotational speed.

6 Claims, 6 Drawing Sheets

NUMERICAL CONTROL MACHINE

PRIORITY INFORMATION

This application claims priority to Japanese Patent Application No. 2012-37442, filed on Feb. 23, 2012, which is incorporated herein by reference in its entirety.

BACKGROUND

1. Technical Field

The present invention relates to a numerical control machine including a vibration suppressing unit that fluctuates, in a predetermined fluctuation cycle, a commanded rotational speed of a main spindle based on pre-stored main spindle fluctuation data including the fluctuation cycle, and also fluctuates a feed rate of a feed axis while maintaining a constant ratio between the feed rate of the feed axis and the rotational speed of the main spindle.

2. Related Art

As a method for suppressing chattering vibrations in cutting processing, a method disclosed in JP 49-105277 A is known. This method suppresses chattering vibrations by fluctuating the rotational speed of a main spindle during cutting processing with a preset fluctuation amplitude and fluctuation cycle.

Another method for suppressing chattering vibrations is disclosed in JP 11-129144 A in which when chattering vibrations occur, the rotational speed of a main spindle and feed rate of a feed axis are fluctuated while maintaining a constant ratio between the rotational speed of the main spindle and the feed rate of the feed axis. Furthermore, JP 2005-144580A discloses a method in which acceleration/deceleration pattern of rotational speed of the main spindle is preset and it is possible to fluctuate the rotational speed of the main spindle based on the preset acceleration/deceleration pattern while also fluctuating the feed rate of feed axis.

In cutting processing, non-uniform cutting surfaces are caused unless the cutting feeding amount per one rotation of a main spindle is kept constant. In the methods disclosed in JP 11-129144 A and JP 2005-144580 A, because it is possible to keep the cutting feeding amount per one rotation of the main spindle constant, it is possible to suppress chattering vibrations while achieving uniform cutting surfaces.

On the other hand, in the method disclosed in JP 49-105277 A, the rotational speed of a main spindle alone is fluctuated. However, a method for obtaining an actual speed of a main spindle from a sensor mounted with the main spindle and determining a feed rate of a feed axis based on the actual speed so as to maintain a constant cutting feed amount is well-known. Therefore, by combining this method, it becomes possible to suppress chattering vibrations while achieving uniform cutting surfaces in the same manner as JP 11-129144 A and JP 2005-144580 A, JP 49-105277 A.

SUMMARY OF THE INVENTION

Problems to be Solved by the Invention

A feed axis to be controlled by a numerical control machine is made from two or more axes such that the axes are combined in any manner to perform an interpolation operation. At this time, in order to ensure a two/three dimensional path, a constant acceleration/deceleration time control (acceleration/deceleration based on moving average method) is performed such that the same acceleration/deceleration time is applied to all the axes to which the interpolation operation is applied. This means that the applied acceleration/deceleration time is required before reaching the command speed. On the other hand, for the main spindle to be controlled by the numerical control machine, it is not necessary to ensure a path as for the feed axis as long as the main spindle rotates at the command speed. Therefore, because no constant acceleration/deceleration time control is performed, the time to reach the command speed, as well as speed variation during that period, may change according to circumstances.

Because, as described above, the acceleration/deceleration control is different between the main spindle and feed axis, a disparity may occur between the actual operations of the main spindle and feed axis even when speed commands for the main spindle and feed axis are fluctuated in the same manner as in the method of JP 11-129144 A and JP 2005-144580 A.

Furthermore, in the method of JP 49-105277 A, another disparity occurs due to a time lag between the time when the rotational speed of a main spindle is sensed and the time required before reaching the feed rate sufficient for the sensed rotational speed of the main spindle.

Due to the above disparities, in an actual operation, a phase difference occurs between the rotational speed fluctuation of the main spindle and the feed rate fluctuation. Accordingly, the cutting feed amount per one rotation of the main spindle becomes not constant and fluctuated. This causes a problem that, due to such a difference, stripes are likely to appear on a processed surface, lowering quality of finished surfaces.

Means for Solving the Problems

A numerical control machine according to the present invention comprises a vibration suppression unit that fluctuates, in a predetermined fluctuation cycle, a commanded rotational speed of a main spindle based on pre-stored main spindle rotation fluctuation data including the fluctuation cycle and also fluctuates a feed rate of a feed axis while maintaining a constant ratio between the feed rate of the feed axis and the rotational speed of the main spindle, wherein the numerical control machine further comprises: a delay time calculating unit for calculating a delay time that is a phase difference between a rotational speed fluctuation of the main spindle and a feed rate fluctuation of the feed axis; a main spindle rotational speed storage unit that stores, for at least one fluctuation cycle, a main spindle actual rotational speed that fluctuates in the predetermined fluctuation cycle; a main spindle rotational speed estimation unit that performs an estimate calculation of a future rotational speed of the main spindle a delay time ahead based on the main spindle actual rotational speed stored in the main spindle rotational speed storage unit, the fluctuation cycle in the main spindle rotation fluctuation data, and the delay time calculated by the delay time calculating unit; and a feed axis fluctuation control unit that fluctuates a commanded feed rate of the feed axis such that a constant ratio is maintained with the estimated future rotational speed of the main spindle the delay time ahead.

Another numerical control machine according to the present invention comprises a vibration suppression unit that fluctuates, in a predetermined fluctuation cycle, a commanded rotational speed of a main spindle based on pre-stored main spindle rotation fluctuation data including the fluctuation cycle and also fluctuates a feed rate of a feed axis while maintaining a constant ratio between the feed rate of the feed axis and the rotational speed of the main spindle, wherein the numerical control machine further comprises: a delay time calculating unit for calculating a delay time that is a phase difference between a rotational speed fluctuation of the main spindle and a feed rate fluctuation of the feed axis; a main spindle rotational speed estimation unit that performs an estimate calculation of a future rotational speed of the main spindle a delay time ahead based on a difference between an actual rotational speed of the main spindle sensed by a main spindle rotational speed sensor unit and a main spindle rotational speed command, the main spindle rotation fluctuation data, and the delay time calculated by the delay time calculating unit; and a feed axis fluctuation control unit that fluctuates a commanded feed rate of the feed axis such that a constant ratio is maintained with the estimated future rotational speed of the main spindle ahead for the delay time.

In a preferred embodiment, the delay time calculating unit calculates the delay time based on a time lag between a time when the rotational speed of the main spindle is sensed and a time when the feed rate is fluctuated such that a constant ratio is maintained with the rotational speed of the main spindle. In another embodiment, the delay time calculating unit calculates the delay time based on an acceleration/deceleration time used to perform acceleration/deceleration of the feed axis by a constant acceleration/deceleration control.

Advantages of the Invention

In accordance with the present invention, it is possible to reduce fluctuation in a cutting feed amount per one rotation of the main spindle by minimizing a phase difference which causes between the rotational speed fluctuation of the main spindle and the feed rate fluctuation at a time of processing while fluctuating the rotational speed of the main spindle in order to suppress chattering vibrations during cutting processing. As a result, it becomes possible to suppress occurrence of stripes on a processed surface and avoid reduction of quality of finished surfaces.

BEST MODE FOR CARRYING OUT THE INVENTION

Figure 1:
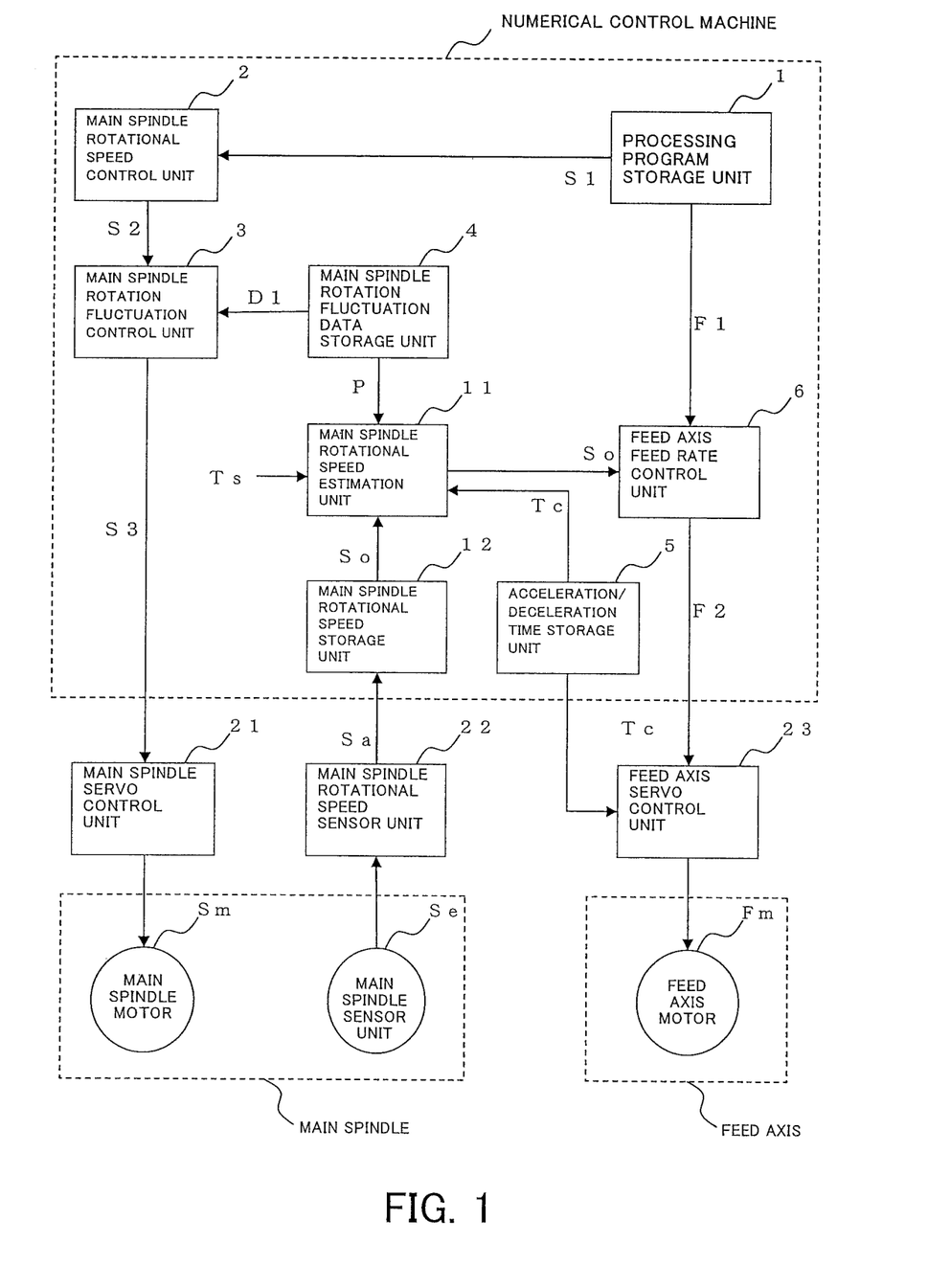
FIG. 1 is a block diagram showing a configuration of a numerical control machine according to one embodiment of the present invention.

Embodiments according to the present invention are described below by referring to the drawings. FIG. 1 is a block diagram showing a configuration of a numerical control machine according to one embodiment of the present invention.

First, operations of a main spindle are described. A main spindle rotational speed program command S1 which is read from a processing program storage unit 1 is input to a main spindle rotational speed control unit 2. In the main spindle rotational speed control unit 2, various arithmetic processes are performed on the main spindle rotational speed program command S1 to calculate and output a main spindle rotational speed command S2. These various arithmetic processes include, for example, arranging the rotational speed within an allowable range in accordance with a current main spindle gear range conditions when a multi-stage main spindle gear range is used, with an override switch disposed externally, multiplying magnification in accordance with an input value from the override switch, and others.

A main spindle rotation fluctuation control unit 3 reads out fluctuation control data D1 from a main spindle rotation fluctuation data storage unit 4 and performs arithmetic processes on the received main spindle rotational speed command S2 in accordance with the fluctuation control data D1 to generate a main spindle fluctuation rotational speed command S3. The fluctuation control data D1 may be, for example, a fluctuation amplitude, fluctuation cycle, and a waveform (for example, triangular waveform, sinusoidal waveform, or the like), and a fluctuation pattern which represents a fluctuation rate of rotational speed of the main spindle per very short period (about 2 or 3 milliseconds up to about 12 or 13 milliseconds), or the like.

Described here are arithmetic processes used when generating a main spindle fluctuation rotational speed command S3. The main spindle fluctuation rotational speed command S3 can be calculated by Equation 1 below when the fluctuation control data D1 is made up of, for example, a fluctuation amplitude Q, fluctuation cycle P, and sinusoidal waveform, where t represents an elapsed time after the start of a main spindle rotation fluctuation control.

$$S3=S2 \times Q \times \sin((2 \times \pi/P) \times t) \qquad \text{Equation 1}$$

Described here is a case when the fluctuation control data D1 shows a fluctuation pattern. For example, the fluctuation pattern for performing the same fluctuation control as with the fluctuation amplitude Q, fluctuation cycle P, and sinusoidal waveform includes the data group shown below where D is a data interval of the fluctuation pattern.

$$Q \times \sin((2 \times \pi/P) \times D \times 1)$$

$$Q \times \sin((2 \times \pi/P) \times D \times 2)$$

$$Q \times \sin((2 \times \pi/P) \times D \times ((P-1)/D))$$

$$Q \times \sin((2 \times \pi/P) \times D \times (P/D))$$

Assuming that each of the above data is PT (n) where n represents 1 to (P/D), the main spindle fluctuation rotational speed command S3 can be represented by Equation 2 below, where t represents an elapsed time after the start of a main spindle rotation fluctuation control; and [t mod P] represents a remainder when t is divided by P.

$$S3=S2 \times PT(((t \bmod P)+1)/D) \qquad \text{Equation 2}$$

It should be noted that the fluctuation cycle P when the fluctuation control data D1 is a fluctuation pattern can be calculated by Equation 3 below.

$$P=\text{number of data groups/data interval } D \qquad \text{Equation 3}$$

The main spindle fluctuation rotational speed command S3 calculated from above Equation 2 is input to a main spindle servo control unit 21. The input timing is synchronized with a SYNC signal (interpolation signal) which is generated in the numerical control machine. The SYNC signal is a signal used to define data input/output timing between the numerical control machine and its peripheral devices such as a servo control unit. The SYNC signal is, for example, a signal output in an 8 millisecond cycle. The main spindle servo control unit 21 controls a main spindle motor Sm to operate in accordance with the input main spindle fluctuation rotational speed command S3.

The main spindle is provided with a sensor Se (such as a magnetic encoder or pulse generator) that can sense a position of the main spindle. The sensed data is input to a main spindle rotational speed sensor unit 22. The main spindle rotational speed sensor unit 22 converts the input sensed data to a main spindle actual speed Sa and outputs the converted data to a main spindle rotational speed storage unit 12. Because the input of the sensed data to the main spindle rotational speed sensor unit 22 is performed at a constant cycle, it is possible to calculate the rotational speed of the main spindle based on the positions of the main spindle between the cycles.

The main spindle rotational speed storage unit 12 receives and stores the main spindle actual speed Sa in synchronization with the SYNC signals. This process is described by referring to the flowchart in FIG. 2, and the timing diagram (the upper diagram) and internal configuration diagram (the lower diagram) in FIG. 3. The main spindle rotational speed storage unit 12 is made up of a storage area that stores two or more main spindle actual speeds Sa and a pointer that indicates a position of the data which is most recently stored. The main spindle rotational speed storage unit 12 performs steps in the order shown below while synchronizing with the SYNC signals.

Figure 2:
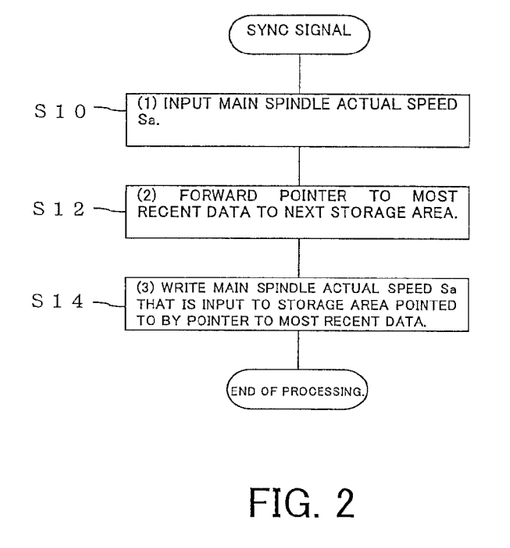
FIG. 2 is a flow chart describing processes of a main spindle rotational speed storage unit.
Figure 3:
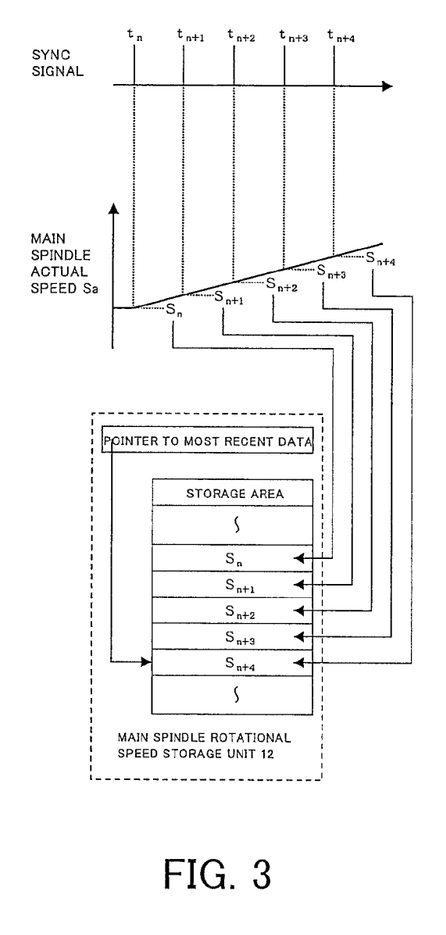
FIG. 3 is a timing diagram and an internal configuration diagram describing storage contents and timing of the main spindle rotational speed storage.

First, the main spindle rotational speed storage unit 12 receives the main spindle actual speed Sa (S10). Subsequently, the main spindle rotational speed storage unit 12 sets the pointer pointing to the most recent data forward to the next storage area (S12). Then, the main spindle rotational speed storage unit 12 writes the received main spindle actual speed Sa to the storage area that is pointed to by the pointer to the most recent data.

By perfuming the above steps in synchronization with the SYNC signals, the main spindle rotational speed storage unit 12 stores the main spindle actual speed Sa per one SYNC signal. For example, as shown in the upper timing diagram in FIG. 3, when the main spindle actual speed Sa is received as $S_n$, $S_{n+1}$, $S_{n+2}$, $S_{n+3}$, and $S_{n+4}$ from time $t_n$ to time $t_{n+4}$ where n represents the count (nth time) of the SYNC signals, each of $S_n$, $S_{n+1}$, $S_{n+2}$, $S_{n+3}$, and $S_{n+4}$ is stored in the main spindle rotational speed storage unit 12. Before the next SYNC signal at time $t_{n+5}$, the pointer to the most recent data points to the area where $S_{n+4}$ is stored.

Next, the main spindle rotational speed estimation unit 11 performs steps. The steps are described by referring to the flowchart shown in FIG. 4. These steps are performed in synchronization with the SYNC signals after the completion of storage of the main spindle actual speed Sa in the main spindle rotational speed storage unit 12.

Figure 4:
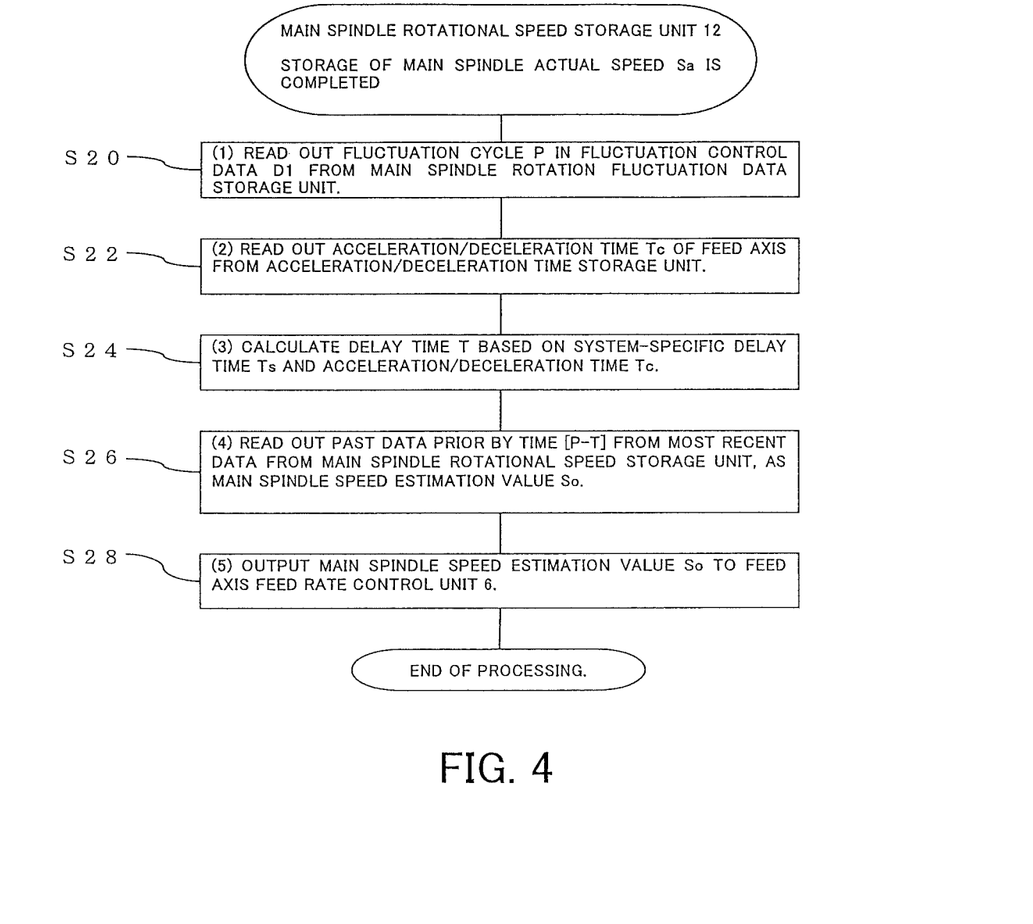
FIG. 4 is a flow chart describing processes of a main spindle rotational speed estimation unit.

As shown in FIG. 4, first of all, the main spindle rotational speed estimation unit 11 reads out a fluctuation cycle P included in the fluctuation control data D1 from the main spindle rotation fluctuation data storage unit 4 (S20). Subsequently, the main spindle rotational speed estimation unit 11 reads out an acceleration/deceleration time Tc of a feed axis from an acceleration/deceleration time storage unit 5 (S22). A delay time T is calculated based on a system-specific delay time Ts and the acceleration/deceleration time Tc (S24). Subsequently, the main spindle rotational speed estimation unit 11 reads out, as a main spindle speed estimation value So, a main spindle actual speed that was obtained at time [P-T] the past from the most recent data from the main spindle rotational speed storage unit 12 (S26). Then, the main spindle rotational speed estimation unit 11 outputs the main spindle speed estimation value So to the feed axis feed rate control unit 6.

It should be noted that the acceleration/deceleration time Tc is read from a data file or the like used for servo control in an initialization process or the like at the time of startup of the numerical control machine, and stored in the acceleration/deceleration time storage unit 5.

Further, the delay time T is a phase difference between the rotational speed fluctuation of the main spindle and the feed rate fluctuation when performing a conventional technique. The delay time T is caused by two factors. A first factor is due to a delay in feed control per rotation of the main spindle. The feed control per rotation of the main spindle controls the feed rate of the feed axis so as to obtain the cutting feed amount per one rotation of the main spindle as commanded by a processing program. When the feed axis feed rate is determined based on the sensed speed of the main spindle as in the present embodiment, the delay time means a time duration between the time when the speed of the main spindle is sensed and the time when the feed rate reaches a value suitable for the sensed main spindle speed. As this delay is a system-specific time, this delay is called system-specific delay time Ts. Ts is a time duration between the time when the speed of the main spindle is sensed and the time when the feed axis motor FM starts operation that achieves a feed rate suitable for the sensed main spindle speed. Because the system-specific delay time Ts is a system-specific time, the delay time Ts does not change during operation. Therefore, the system-specific delay time Ts is read from a data file or the like in an initializing process or the like at the time of start-up of the numerical control machine and set only once. Further, this time is set in the main spindle rotational speed estimation unit 11 which uses the delay time Ts.

The second delay factor is a delay caused by constant acceleration/deceleration time control. The constant acceleration/deceleration time control determines a speed after acceleration/deceleration based on a moving average method applied to a speed before the acceleration/deceleration. Therefore, a phase difference occurs between the speed fluctuation of the speed before the acceleration/deceleration and the speed fluctuation of the speed after the acceleration/deceleration. This phase difference results in a delay time.

Figure 5:
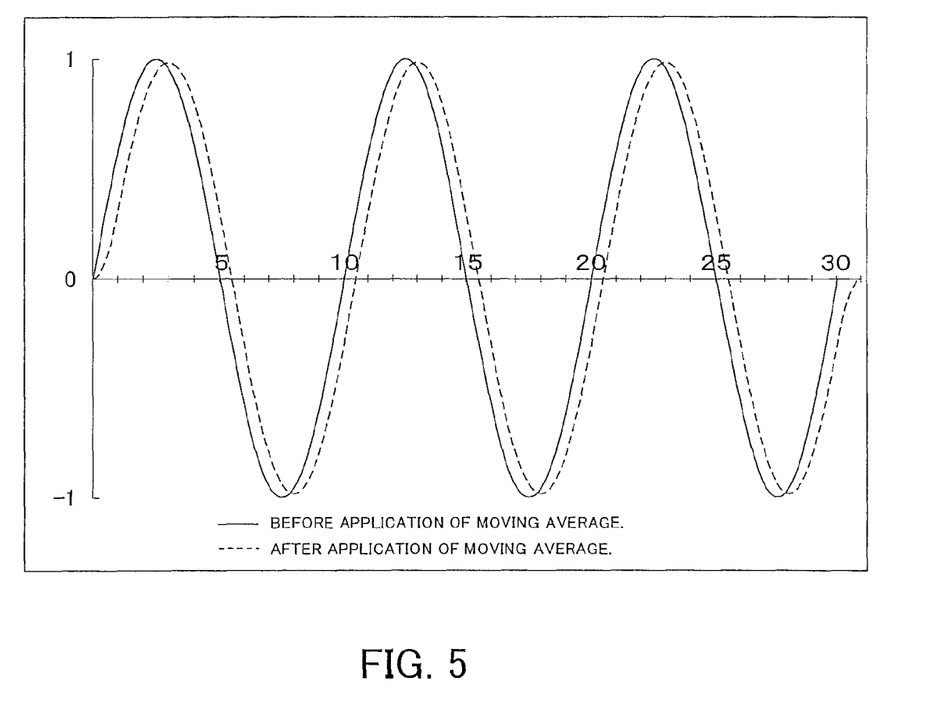
FIG. 5 is an explanatory chart describing a waveform phase difference by a moving average method.

FIG. 5 is an explanatory chart describing a waveform phase difference caused in the moving average method. As an example, a case where a sine wave with cycle of 10 and amplitude of 1 for three cycles is shown in a solid line, while a broken line shows a waveform when a moving average is calculated for the time corresponding to one increment in the scale. It is understandable that phases of the two waves are shifted from each other for half of one increment in the scale. Thus, the waveform after application of moving average has characteristics that the waveform has a phase difference shifted with respect to the waveform before application of moving average for half the moving average time. Because the acceleration/deceleration constant control is based on the moving average, the acceleration/deceleration constant control has the same characteristics. Thus, the second delay factor is Tc/2 at acceleration/deceleration time Tc.

Thus, as the delay time T is a total of the first delay factor and the second delay factor, the delay time T is obtained from the following Equation 4 which uses the system-specific delay time Ts and the acceleration/deceleration time Tc.

$$T = Ts + (Tc/2) \hspace{2cm} \text{Equation 4}$$

Figure 6:
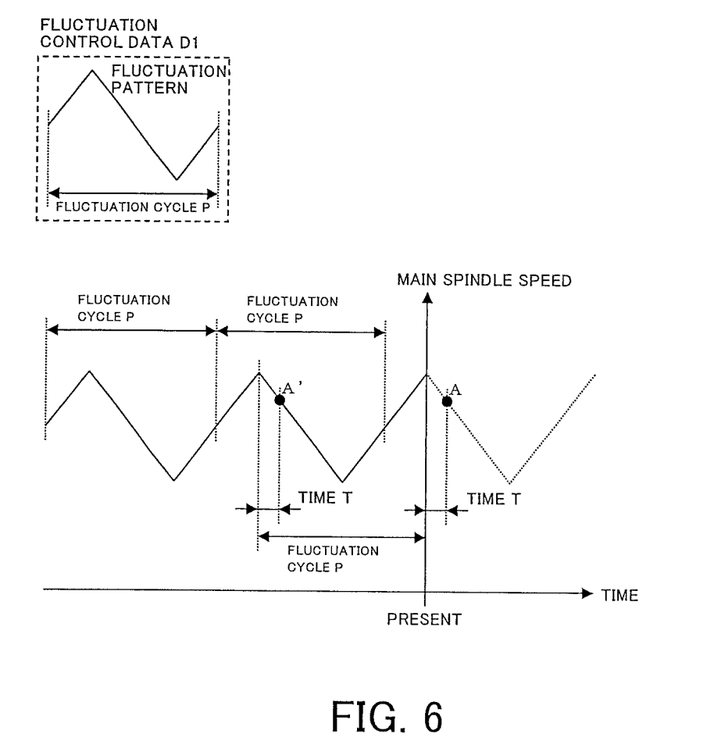
FIG. 6 is an explanatory chart describing a reason why the past speed of the main spindle prior by time [P-T] is read out.

Next, the reason why the past speed of the main spindle prior by time [P-T] is read out is described by referring to FIG.

6. It is assumed that the speed of the main spindle from a certain point in the past to the present with the main spindle operating in accordance with the fluctuation control data D1 is as shown in FIG. 6. Because the operation of the feed axis is delayed for a delay time T, it is necessary to calculate the future feed axis feed rate at a time which is forward from present by time T, in order to eliminate this delay. The main spindle speed at time A is required in order to achieve this, but the data is not available because the speed is in the future. Thus, the repeated operation of the main spindle in accordance with the fluctuation control data D1 is utilized. Because the main spindle speed at time [A] should be almost equal to the main spindle speed at time [A'], the main spindle speed at time [A'] is used for calculating the feed axis feed rate. The main spindle speed at time [A'] is the speed in the past by time [P-T].

The method for reading out the past speed of the main spindle prior by time [P-T] is to refer to data in the past for time [P-T] from the data which is pointed to by the pointer to the most recent data in the main spindle rotational speed storage unit 12. Because the data is stored in time order in synchronization with the SYNC signals, the data in the past by the number obtained by (P-T)/(SYNC signal cycle) can be read out and used. The read out data can be used as the main spindle speed estimation value So.

Next, the operation of the feed axis is described. A feed rate program command F1 readout from a processing program storage unit 1 is input to the feed axis feed rate control unit 6. The main spindle speed estimation value So output from the main spindle rotational speed estimation unit 11 is also input. The feed axis feed rate control unit 6 calculates a feed axis feed rate command F2 with which the feed axis move amount per one rotation of the main spindle equals F1. This speed can be obtained by F2=So×F1. The calculated feed axis feed rate command F2 is output to a feed axis servo control unit 23 in synchronization with the SYNC signals.

Further, an acceleration/deceleration time Tc is output to the feed axis servo control unit 23 from the acceleration/deceleration time storage unit 5 in synchronization with the SYNC signals. The feed axis servo control unit 23 controls the operation of the feed axis motor Fm by performing the constant acceleration/deceleration time control with the input feed axis feed rate command F2 and the acceleration/deceleration time Tc.

The fluctuation in cutting feed amount per one rotation of the main spindle can be minimized by making the phase difference between the rotational speed fluctuation of the main spindle and the feed rate fluctuation when processing is performed in cutting processing as small as possible while the rotational speed of the main spindle is fluctuated, so as to suppress chattering vibrations. As a result, occurrence of stripes on a processed surface can be suppressed, and thus it becomes possible to prevent the deterioration of finished surface quality.

Next, a second embodiment is described. In the first embodiment described above, the main spindle actual speed Sa is stored in order and an estimate calculation of a future speed of the main spindle at time ahead by delay time T is performed based on the stored main spindle actual speed. On the other hand, in the second embodiment, an estimate calculation of a future speed of the main spindle ahead by delay time T is performed based on the fluctuation control data D1 stored in the main spindle rotation fluctuation data storage unit 4.

Figure 7:
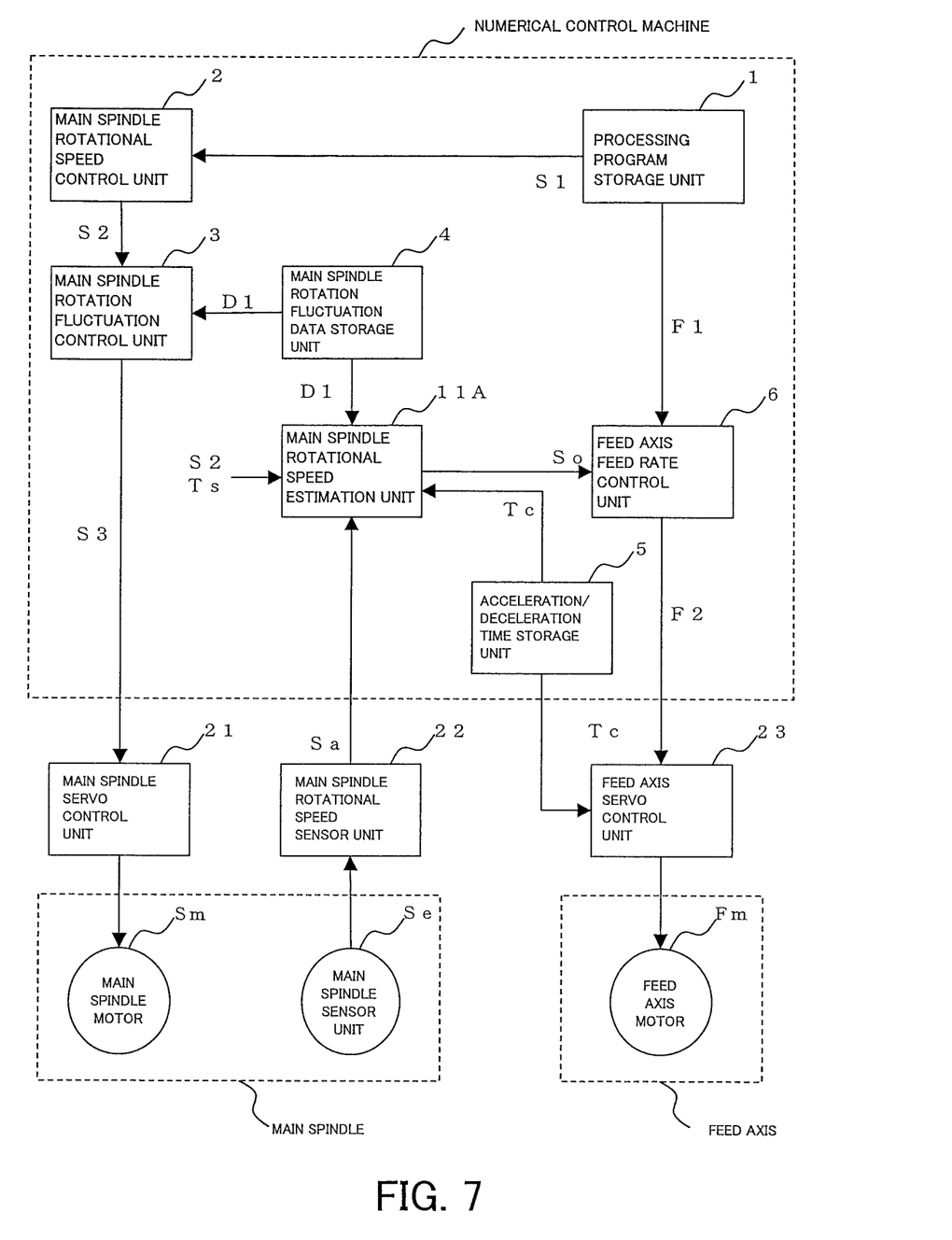
FIG. 7 is block diagram showing a configuration of a numerical control machine according to a second embodiment of the present invention.

The second embodiment is described by focusing on differences from the first embodiment by referring to FIG. 7. The main spindle rotational speed control unit 2 outputs the calculated main spindle rotational speed command S2 to the main spindle rotation fluctuation control unit 3 and to the main spindle rotational speed estimation unit 11A.

The main spindle rotational speed estimation unit 11A subtracts the main spindle rotational speed command S2 calculated by the main spindle rotational speed control unit 2 from the current main spindle actual speed Sa output from the main spindle rotational speed sensor unit 22 to calculate a current actual fluctuation amplitude corresponding to a fluctuation amplitude Q in the fluctuation control data D1. The fluctuation amplitude Q is a difference from the main spindle rotational speed command. The main spindle rotational speed estimation unit 11A compares the calculated current actual fluctuation amplitude to the fluctuation amplitude Q in the fluctuation control data D1 stored in the main spindle rotation fluctuation data storage unit 4 to obtain a fluctuation control point in the fluctuation control data D1 where the fluctuation amplitude Q equals the current actual fluctuation amplitude by referring to the previous actual fluctuation amplitude calculated in the previous process. In other words, because, in general, there are two or more points in the fluctuation control data D1 in one cycle where the fluctuation amplitude equals the current actual fluctuation amplitude (refer to FIG. 6), the main spindle rotational speed estimation unit 11A refers to the previous actual fluctuation amplitude to determine whether the fluctuation control point is in an ascending ramp or descending ramp to obtain an appropriate fluctuation control point.

Further, the main spindle rotational speed estimation unit 11A obtains a fluctuation control point in the fluctuation control data D1 which is ahead by a delay time T and calculates the fluctuation amplitude at the fluctuation control point to obtain the main spindle speed estimation value So by adding the calculated fluctuation amplitude to the main spindle rotational speed command S2. Then, the main spindle rotational speed estimation unit 11A calculates a feed axis feed rate command so as to maintain a constant ratio with the calculated main spindle speed estimation value So in the same manner as in the first embodiment.

As described above, when processing is performed while fluctuating a rotational speed of the main spindle in order to suppress chattering vibration in cutting processing, it is possible to achieve a very small phase difference between the rotational speed fluctuation of the main spindle and the feed rate fluctuation of the feed axis with use of a small number of storage units by using the main spindle rotation fluctuation data which is used to fluctuate the main spindle rotational speed without storing the main spindle actual speed Sa for more than one cycle.

What is claimed is:

1. A numerical control machine comprising a vibration suppression unit that fluctuates, in a predetermined fluctuation cycle, a commanded rotational speed of a main spindle based on pre-stored main spindle rotation fluctuation data including the fluctuation cycle and also fluctuates a feed rate of a feed axis while maintaining a constant ratio between the feed rate of the feed axis and the rotational speed of the main spindle, wherein the numerical control machine further comprises:
   a delay time calculating unit for calculating a delay time that is a phase difference between a rotational speed fluctuation of the main spindle and a feed rate fluctuation of the feed axis;
   a main spindle rotational speed storage unit that stores, for at least one fluctuation cycle, a main spindle actual rotational speed that fluctuates in the predetermined fluctuation cycle;

a main spindle rotational speed estimation unit that performs an estimate calculation of a future rotational speed of the main spindle ahead by a delay time based on
the main spindle actual rotational speed stored in the main spindle rotational speed storage unit,
the fluctuation cycle in the main spindle rotation fluctuation data, and
the delay time calculated by the delay time calculating unit; and
a feed axis fluctuation control unit that fluctuates a commanded feed rate of the feed axis such that a constant ratio is maintained with the estimated future rotational speed of the main spindle ahead by the delay time.

2. The numerical control machine according to claim 1 wherein the delay time calculating unit calculates the delay time based on a time lag between a time when the rotational speed of the main spindle is sensed and a time when the feed rate is fluctuated, such that a constant ratio is maintained with the rotational speed of the main spindle.

3. The numerical control machine according to claim 1 wherein the delay time calculating unit calculates the delay time based on an acceleration/deceleration time used to perform acceleration/deceleration of the feed axis by a constant acceleration/deceleration control.

4. A numerical control machine comprising a vibration suppression unit that fluctuates, in a predetermined fluctuation cycle, a commanded rotational speed of a main spindle based on pre-stored main spindle rotation fluctuation data including the fluctuation cycle, and also fluctuates a feed rate of a feed axis while maintaining a constant ratio between the feed rate of the feed axis and the rotational speed of the main spindle, wherein the numerical control machine further comprises:

a delay time calculating unit calculating a delay time that is a phase difference between a rotational speed fluctuation of the main spindle and a feed rate fluctuation of the feed axis;
a main spindle rotational speed estimation unit that performs an estimate calculation of a future rotational speed of the main spindle ahead by a delay time based on
a difference between an actual rotational speed of the main spindle sensed by a main spindle rotational speed sensor unit and a main spindle rotational speed command,
the main spindle rotation fluctuation data, and
the delay time calculated by the delay time calculating unit; and
a feed axis fluctuation control unit that fluctuates a commanded feed rate of the feed axis such that a constant ratio is maintained with the estimated future rotational speed of the main spindle ahead for the delay time.

5. The numerical control machine according to claim 4 wherein the delay time calculating unit calculates the delay time based on a time lag between a time when the rotational speed of the main spindle is sensed and a time when the feed rate is fluctuated, such that the constant ratio is maintained with the estimated future rotational speed of the main spindle.

6. The numerical control machine according to claim 4 wherein the delay time calculating unit calculates the delay time based on an acceleration/deceleration time used to perform acceleration/deceleration of the feed axis by a constant acceleration/deceleration control.

* * * * *